United States Patent [19]

Frosch et al.

[11] 4,222,669
[45] Sep. 16, 1980

[54] INTERFEROMETER FOR DETERMINING THE SHAPE OF AN OBJECT

[75] Inventors: Albert Frosch, Herrenberg; Gerhard Holzinger, Sindelfingen; Walter Jaerisch, Boeblingen; Claus Scheuing, Lorch, all of Fed. Rep. of Germany

[73] Assignee: International Business Machines Corporation, Armonk, N.Y.

[21] Appl. No.: 853,053

[22] Filed: Nov. 21, 1977

[30] Foreign Application Priority Data

Dec. 23, 1976 [DE] Fed. Rep. of Germany ....... 2658399

[51] Int. Cl.$^3$ .............................................. G01B 9/02
[52] U.S. Cl. .................................................. 356/360
[58] Field of Search .............................. 356/359, 360

[56] References Cited

U.S. PATENT DOCUMENTS 4,022,532  5/1977  Montagnino ......................... 356/359

Primary Examiner—Conrad J. Clark
Attorney, Agent, or Firm—Henry Powers

[57] ABSTRACT

This invention relates to an interferometric process, and particularly to a process for examining the planarity of surfaces.

25 Claims, 3 Drawing Figures

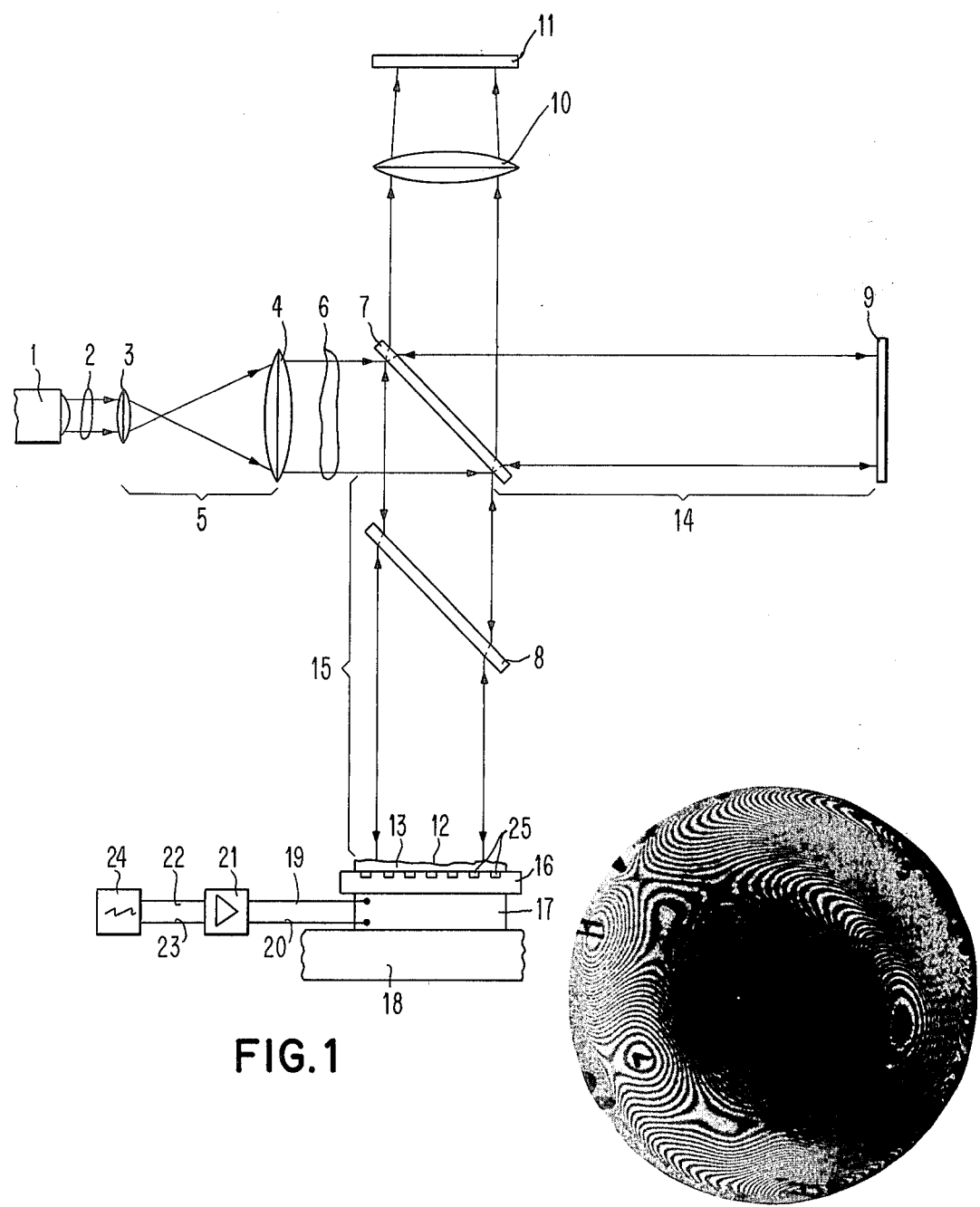
FIG.1
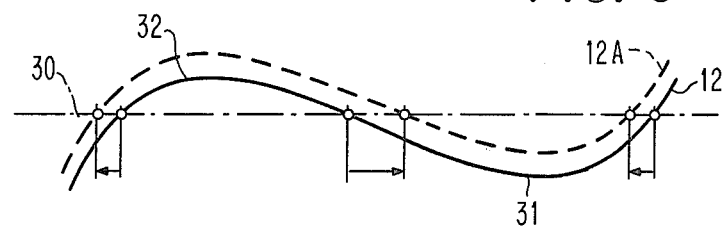
FIG. 3
FIG. 2

INTERFEROMETER FOR DETERMINING THE SHAPE OF AN OBJECT

In almost all fields of science and technology, particularly in connection with the production of miniaturized integrated semiconductor circuits, measuring processes are required having a precision well beyond the wavelength of light. In view of the increasing number of such measurements and the ever increasing demands on precision, and because the majority of all measured objects are very easily damaged, interferometric measuring processes according to Fizeau, Michelson, Moire processes or holographic processes have recently been used widely.

These processes have the advantages of high precision, contact-free measurement, extremely high measuring speed, and easy calibration. Moreover, in connection with planarity measurements, large areas can be covered simultaneously with a single measuring process. Especially with respect to the examination of elements to be processed the latter feature renders the interferometric processes particularly suitable for the control and monitoring of the manufacture of elements to be made in large quantities, for instance in the manufacture of integrated semiconductor circuits.

A disadvantage exists, however, in that interference fringe patterns indicate only the amount of the slope and not the sign of the slope of an inclined surface. In particular, a system of interference fringes merely indicates that there are extrema, i.e., concave or convex areas in the respective area sections. Any indication as to whether there is a maximum (convex area, hill) or a minimum (concave area, valley) is generally not possible without specific steps. These steps are time-consuming and affect the quality of the objects to be measured. For obtaining this missing information a ledge or groove is sometimes provided as an auxiliary structure in the reference surface used for making the interferogram. Consequently, a step becomes visible in the interference fringe system which always points either "upward" or "downward" to identify the missing information.

The use of such auxiliary structures is undesirable since the structures may have to be repeatedly aligned with respect to the structures of the object; the auxiliary structure and object structure may possibly be confused, and the evaluation, particularly when a large number of objects have to be measured, generally requires considerable concentration by the operator on the measuring process, to exclude errors concerning the sign of the slopes (plus or minus).

It is the object of the invention to avoid the above disadvantages, and to provide an interferometric process for examining the planarity of surfaces by means of which the slopes of an examined surface and also the signs of these slopes can be determined in a clear and simple manner by visual as well as automatic evaluation.

In contrast to the formerly used time consuming and unreliable processes, the signs of the slopes given by an interferogram can be obtained by means of the process disclosed herein in a simple manner and with a great reliability through visual as well as automatic evaluation within a short time. When the interferograms are evaluated visually the sign can be determined within a few tenths of a second, and the period for automatic evaluation can be less than milliseconds.

The invention is explained in the following specification taken in conjunction with the drawings wherein:

FIG. 1 is an embodiment of an apparatus for carrying out the process as disclosed by the invention;

FIG. 2 is the sectional view through a surface to be examined; and

FIG. 3 is an interferogram representing a surface to be examined.

The embodiment of FIG. 1 consists of a conventional Michelson interferometer and an object carrier including the invention herein.

The cross-section of radiation 2 emanating from a light source 1, which can be a laser, for example, is expanded by a device 5, consisting of lenses 3 and 4, to adapt the cross-section to the size of a surface 12 to be examined of an object 13 to be measured. The resulting expanded beam 6 is adapted to the diameter of the object to be measured and impinges on a planar plate 7 which is semi-transparent on its lower side. Part of the radiation intensity passes through this plate and impinges on a fixedly mounted reflecting surface 9 from which it is reflected back on the same path and directed partly by the semi-transparent planar plate 7 to an observation screen 11 via a lens 10.

The other part of the radiation intensity of beam 6 is reflected by the semi-transparent surface of planar plate 7 to the surface 12 of an object 13 to be measured. The radiation reflected from surface 12 is directed through a planar plate 8, provided to compensate the optical path lengths 14 and 15, and through plate 7 and lens 10 to observation screen 11 where an interferogram is formed, in well known fashion, consisting of interference fringes and representing the non-planarity of surface 12. Such a pattern or interferogram is shown in FIG. 3.

It is well known that, heretofore, without time-consuming and complex manipulations it was not possible to determine how such interference fringe families are correlated to convex or concave areas of the surface to be measured.

In order to avoid this disadvantage, the invention herein utilizes a measuring table 16, carrying the object to be measured, placed upon a piezoelectric body 17 which preferably consists of ceramic material. Object 13 to be measured is fixed on table 16 by means of suction channels 25. The body 17 is, in turn, connected to a fixedly mounted substrate 18. Piezoelectric body 17 is connected via conductors 19, 20 to an amplifier 21, and the latter is connected via conductors 22, 23 to a sawtooth generator which generates a sawtooth voltage with a frequency of approximately 3 cps. The piezoelectric body is of such a design, and the amplitude of the amplified sawtooth voltage applied via lines 19, 20 is such that the object table and object to be measured execute a periodical, straight shifting in a direction normal to the overall measuring surface 12, with an amplitude equalling half the wavelength of the radiation generated by radiation source 1.

It is known that each interference fringe generated on observation screen 11 is comparable to a contour line of surface 12, i.e., it is a line which connects all points of the surface which have the same distance to reflecting surface 9. If, as shown in FIG. 2, the profile represented by the continuous line or surface 12 is brought into the position represented by a dashed line 12A, the distance of each point of surface 12 to reflecting surface 9 is altered by the same amount. Consequently, as can be seen from FIG. 2, the points of intersection of surface 12 with a plane 30 defining a contour line tend to shift sideways; i.e., with an upward motion of surface 12 the lines shift toward lower areas, in the case of a concave area 31, and the lines shift away from higher areas in the case of a convex area 32.

If the sawtooth voltage generated by sawtooth generator 24 is selected such that surface 12 is shifted slowly upwards by the excitation of piezoelectric body 17, e.g., within ⅓ sec., by an amount equalling half the wavelength of radiation 6, and then very quickly shifted downwards, e.g., within a few ms, an observer, due to the rather slow observation characteristics of the human eye, will see the interference fringes on observation screen 11 shifting inwardly with respect to surface 12 for concave areas and outwardly for convex areas. This occurs since only the slow shift of the interference fringes during the slow upward motion of surface 12 is seen, and not the quick return during the quick downward motion of surface 12.

An automatic evaluation scheme taking advantage of this phenomena either inert sensors can be used, or sensors that are controlled in accordance with the phase position of the energizing alternate voltage. If the interferograms are to be evaluated only automatically it is possible to increase the frequency of the sawtooth voltage by powers of ten, e.g. 5ms for the upward motion and 0.5 ms for the downward motion. For energizing the piezoelectric body other voltage courses, e.g. sinus-shaped ones, are also possible.

The shifting of the object to be measured can, of course, also take place by means of magnetostrictive bodies, electromagnetic or mechanical devices. If a sufficient stroke is available the slow edge of the sawtooth voltage can be applied during the entire time of observation. The return jump can for instance take place during the exchange of objects.

It is, of course, also possible to design the device in such a way that surface 12 is shifted downwards relatively slowly, and quickly upwards. Shifts by different amounts, for instance by a multiple of the interference fringe distances or Moire line distances can also be advisable. In all cases the number of interference fringes correlated to a specific form of surface 12 remains unchanged under all circumstances, as only the direction of the slopes of the individual areas of surface 12 is indicated by means of lateral shifting of the interference fringes. Instead of a periodical shifting of surface 12 to be examined, it is, of course, also possible to shift reference surface 9 accordingly. In that case if, with concave areas in the surface to be examined, the interference fringes are to shift toward the deepest area the sawtooth voltage would have to be reversed, or the piezoelectric body would have to be given a reversed polarity.

What is claimed is:

1. A method for analyzing the planarity of the surface of an object comprising:
   A. generating a light beam of monochromatic coherent light,
   B. splitting said light beam into a reference beam and an object beam and recombining the reflected reference and object beams into a view path,
   C. positioning an object in said object beam with the surface thereof normal to said object beam,
   D. vibrating said object to advance and recede said surface thereof in a direction normal to said surface, with the vibration being in a pattern wherein the receding of said surface is substantially instantaneous relative to a slow said advance thereof, and
   E. detecting the interference fringe changes in said view beam.

2. The method of claim 1 wherein the amplitude of said vibration is one-half the wavelength of said light.

3. The method of claim 1 wherein said advance is effected within one-third second.

4. The method of claim 3 wherein the amplitude of said vibration is one-half the wavelength of said light.

5. The method of claim 1 wherein said advance is one-tenth as fast as the receding of said surface.

6. The method of claim 5 wherein the amplitude of said vibration is one-half the wavelength of said light.

7. The method of claim 1 wherein said object is mounted on a transducer vibrationally responsive to an applied voltage, and including applying a sawtooth voltage to said transducer.

8. The method of claim 7 wherein the amplitude of said vibration is one-half the wavelength of said light.

9. The method of claim 7, wherein said transducer is a piezoelectric element.

10. The method of claim 9 wherein the amplitude of said vibration is one-half the wavelength of said light.

11. A system for analyzing the planarity of the surface of an object, comprising:
    A. means for generating a light beam of monochromatic coherent light,
    B. means for splitting said light beam into a reference beam and an object beam, and recombining the reflected reference and object beams into a view beam;
    C. means for monitoring said surface of said object in said object beam, with the said surface thereof normal to said object beam,
    D. means for vibrating said object in said object beam to advance and recede said surface thereof in a direction normal to said surface, wherein said vibrating means is characterized with a receding motion substantially instantaneous relative to a slow said advance motion thereof, and
    E. means in said view beam for detecting interference fringe changes resulting from said vibration.

12. The system of claim 11 wherein said vibrating means is characterized with an amplitude of one-half the wavelength of said light.

13. The system of claim 11 wherein said vibrating means is characterized with an advance motion effected within one-third second.

14. The system of claim 13 wherein said vibrating means is characterized with an amplitude of one-half the wavelength of said light.

15. The system of claim 11 wherein said vibrating means is characterized with an advance motion one-tenth as fast as its receding motion.

16. The system of claim 15 wherein said vibrating means is characterized with an amplitude of one-half the wavelength of said light.

17. The system of claim 15 wherein said vibrating means is characterized with an advance motion of 5 milliseconds and a receding motion of 0.5 milliseconds.

18. The system of claim 17 wherein said vibrating means is characterized with an amplitude of one-half the wavelength of said light.

19. The system of claim 11 wherein said vibrating means comprises a transducer having said object mounted thereon, with said transducer responsive to an applied voltage.

20. The system of claim 19 wherein said vibrating means is characterized with an amplitude of one-half the wavelength of said light.

21. The system of claim 19 including means to apply a sawtooth voltage to said transducer.

22. The system of claim 21 wherein said vibrating means is characterized with an amplitude of one-half the wavelength of said light.

23. The system of claim 19 wherein said transducer is a piezoelectric element.

24. The system of claim 23 wherein said vibrating means is characterized with an amplitude of one-half the wavelength of said light.

25. The system of claim 23 including means to apply a sawtooth voltage to said transducer.

* * * * *